United States Patent
Flam

[15] 3,661,142
[45] May 9, 1972

[54] TEMPERATURE-SENSING PATCH
[72] Inventor: Eric Flam, East Brunswick, N.J.
[73] Assignee: Johnson & Johnson
[22] Filed: Feb. 5, 1970
[21] Appl. No.: 8,902

[52] U.S. Cl. ................................................128/2 H, 73/356
[51] Int. Cl. ........................................................A61b 10/00
[58] Field of Search..........................128/2, 156, 2 H; 73/356

[56] References Cited

UNITED STATES PATENTS

| 3,002,385 | 10/1961 | Wahl et al................................73/356 |
| 3,533,399 | 10/1970 | Goldberg et al.........................128/2 R |
| 3,175,401 | 3/1965 | Geldmacher..........................73/356 X |
| 3,307,544 | 3/1967 | Gander et al. ...........................128/156 |

*Primary Examiner*—Hugh R. Chamblee
*Attorney*—Harold L. Warner, Michael Q. Tatlow and Robert L. Minier

[57] ABSTRACT

This temperature-sensing patch comprises a flexible backing web having a pressure-sensitive adhesive coated on one side and a plurality of discrete temperature-sensitive, color-responsive indicators adhered on the other side thereof. Each of the indicators comprises a layer of encapsulated liquid crystals which change in color responsive to temperature changes within a predetermined temperature range.

16 Claims, 5 Drawing Figures

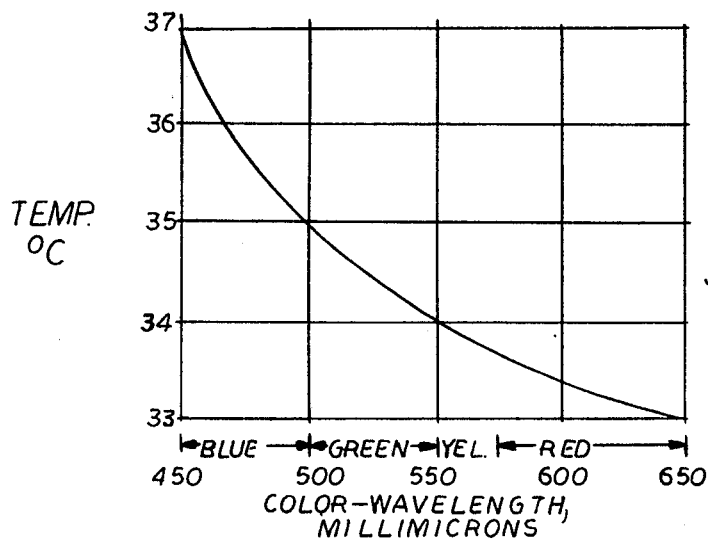
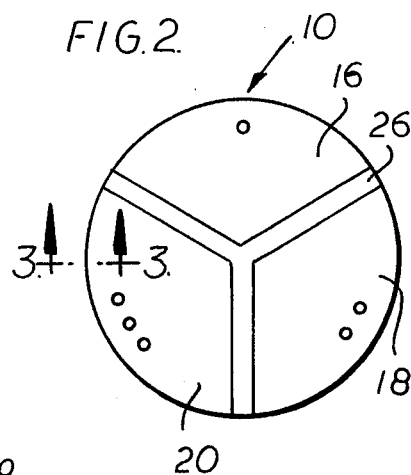
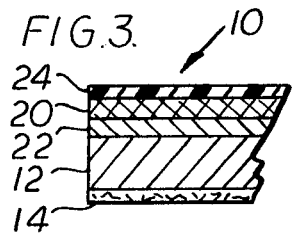
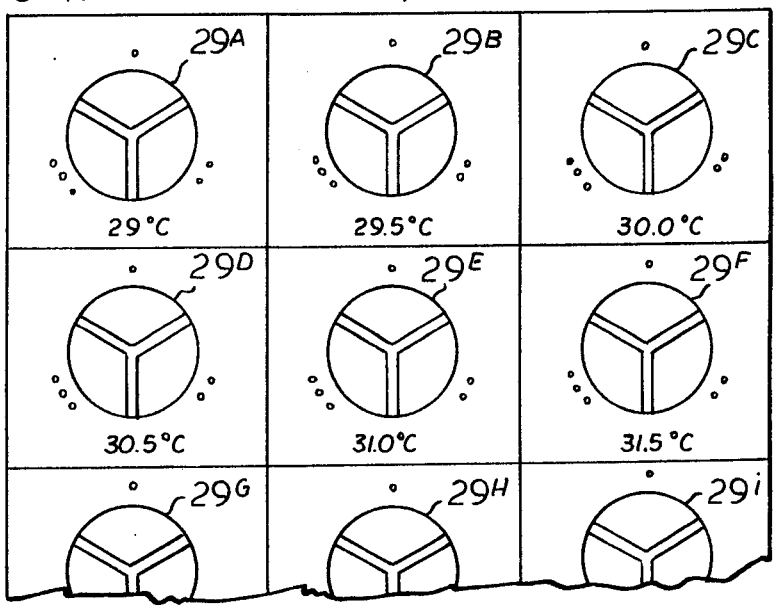
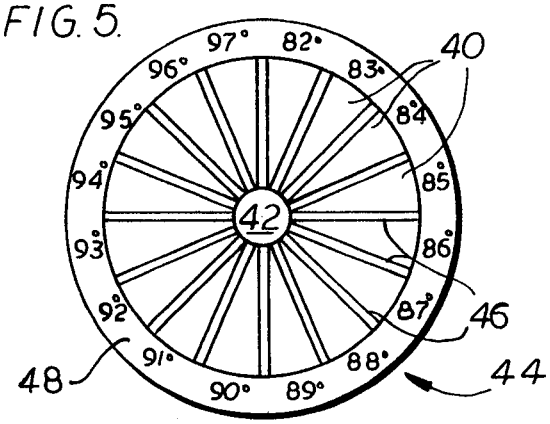
INVENTOR
ERIC FLAM
BY: Harold L. Warner
ATTY

TEMPERATURE-SENSING PATCH

BACKGROUND OF THE INVENTION

1. Field of the Invention

The present invention relates to a field of temperature-indicating devices. More particularly, it relates to an inexpensive patch which is adhered to a surface to visually indicate the temperature thereof by a color response which is related to a predetermined color-temperature relationship.

While the present invention will be described in connection with particular embodiments designed primarily for sensing and visually monitoring thermal patterns in human skin, it should be understood that the use of the invention is not necessarily limited thereto. It can be employed for sensing and monitoring the surface temperature of a variety of other animate and inanimate objects to which it can be adhered, e.g., testing the heat distribution of electronic circuits and devices and detecting the flow paths of internally generated heat in various mechanical and other devices.

2. Description of the Prior Art

It is now well recognized that skin temperature measurements may be a valuable tool in the field of medical diagnostic and monitoring procedures. For example, recent studies have suggested that localized skin temperature variations may be correlatable with subsurface events such as inflammations, cardiovascular difficulties and tumors. Various prior art devices are available for measuring skin temperature but they suffer from one or more shortcomings which have inhibited their extensive use.

For example, metallic skin thermometers require a long time to read and, because they are not always conformable to skin surfaces having varied and changeable conformability requirements, the readings are not always as accurate as desired. Temperature-sensing electrical probes are expensive, involve complex equipment, are inconvenient to set up, and otherwise are not practical for many purposes. Infrared scanners are also very expensive, require complex equipment which is not readily available at desired locations, and otherwise suffer from various difficulties known to those skilled in the art.

Prior-art techniques for utilizing liquid crystals for such temperature measurements have similarly suffered from shortcomings. Types of backing materials have been restricted; temperature ranges have been limited; application techniques have been inconvenient; stability problems have been present; accuracy has suffered; poor conformability, delamination and contact problems have been encountered; and poor flexure resistance has been experienced.

It is therefore a general object of the present invention to provide a temperature-sensing patch which copes with the difficulties encountered with the prior art devices.

It is a more specific object of the present invention to provide a temperature-sensing patch which is inexpensive, convenient to use, provides a continuous reading over a substantial temperature range and is characterized by a sensitive, accurate and very rapid visual temperature response.

It is still another object of the present invention to provide a low-cost, temperature-sensing patch which can detect a substantial range of temperatures at substantially the same location.

It is still another object of the present invention to provide a stable, accurate, sensitive and low-cost visual temperature-sensing patch which can be applied at multiple locations, is highly conformable to the underlying skin, and is not adversely affected by repeated flexure.

It is still another object of the present invention to provide a temperature-sensing patch of high conformability and versatility which extends the practical range of prior-art liquid crystal temperature sensing devices.

These and other objects of the present invention will become apparent as a detailed description thereof proceeds.

SUMMARY OF THE INVENTION

These objects are achieved in a particular embodiment of the present invention by a temperature-sensing patch which comprises a flexible backing web having a pressure-sensitive adhesive coated on one side thereof for holding the flexible backing web in tight direct contact with the underlying skin. On the other or exposed side of the web is disposed a plurality of discrete temperature-sensitive, color-responsive indicators, each of which comprises a layer of encapsulated liquid crystals (sometimes abbreviated ELC's). Each of the indicators displays a color change spectrum corresponding to temperature changes within a different predetermined temperature range. Adjacent indicators on the patch preferably cover overlapping temperature ranges whereby, in effect, a patch is produced displaying a continuous color change over an extended temperature range.

In a preferred embodiment the backing web is circular and the indicators on the surface thereof are disposed in spaced pie-shaped sectors about the center. Other configurations may also be employed, e.g., square, rectilinear and the like. The web is substantially black in color and the pie-shaped sectors are separated or spaced by a border of contrasting color, preferably white.

In still other embodiments, the temperature-sensing patch as a whole or each of the indicators individually is covered with an overlying, substantially-transparent flexible covering such as a transparent plastic film or clear lacquer coating. Additionally or alternatively, a plasticizer or humectant may be added to the ELC's and/or a primer coating may be added to the backing to enhance fracture and delamination resistance. These and other embodiments are discussed in detail hereinafter.

THE FLEXIBLE BACKING WEB

The flexible backing web may comprise any suitable thin film which can be adhered and readily conform to the contours of the underlying skin and to which the ELC's can be adhered without proneness to separation or delamination under normal flexure conditions. Because the liquid crystals are encapsulated, stable patches can be prepared using both polar and non-polar polymers. Suitable films include polyvinyl chloride films, polyolefin films such as polyethylene or polypropylene, polyethylene terephthalate, polyvinylidene chloride-polyvinyl chloride copolymer, polyurethane films, regenerated cellulosic films, paper, natural and synthetic fabrics and the like, preferably polyvinyl chloride.

Depending upon the particular film selected, the thickness thereof is typically in the range of 0.5 mils to 15 mils, e.g., 1 to 10 mils, preferably 2 to 3 mils in the case of polyvinyl chloride film. Thin films are preferred to decrease cost, reduce the mass, enhance flexibility and conformability and to bring the color-responsive indicator as close as possible to the underlying skin surface. Manifestly, the thinner the film, the less the mass and the thermal insulation between the indicator and skin and the more rapid the temperature response. The film, however, should not be so thin as to lack the requisite strength or to encounter the "curl under" edge problem associated with very thin webs having adhesive coatings.

The color of the film is preferably black although other colors may also be employed, e.g., red, yellow, green and blue. The latter, however, have generally been found to be inferior to black for detecting and viewing ELC color changes.

THE PRESSURE-SENSITIVE ADHESIVE

The adhesive which is applied to the flexible backing web can be any conventional pressure-sensitive adhesive which will adhere the web throughout its area to the surface being monitored, whereby good thermal contact is achieved. For measuring skin temperatures, any mass that has acceptable clinical properties is suitable for providing adhesion of the patches to the skin. These include the rubber base and the acrylate pressure-sensitive adhesives.

One operable form of pressure-sensitive adhesive is a pure rubbery copolymer of isooctyl acrylate and acrylic acid in a 94:6 ratio, as described in Ulrich U.S. Pat. No. 2,884,126 (Re. 24,906). Other examples of suitable adhesives are set forth in U.S. Pat. Nos. 2,877,141, 2,909,278, 3,307,544 and 3,325,459.

The amount of adhesive depends upon the particular adhesive, the nature of the surface to which it is applied, the end use of the patch, and the like. Thin coatings are preferred to decrease the mass and enhance heat transfer and rapidity of response. In the embodiment for sensing skin temperatures, the thickness of adhesive may typically be in the range of 0.3 to 3 mils, preferably 0.5 to 1 mil.

The adhesive may be applied to the backing web by conventional techniques, including, for example, transfer techniques, the use of a "kissing" roll, and the like. If spread from a solvent, the coating is dried and, if necessary, cured.

Depending upon the nature of the adhesive and the backing web, a primer may be applied to the web to anchor the adhesive mass. In the case of an acrylate adhesive and a polyvinyl chloride backing web, for example, a polymeric primer of the type disclosed in U.S. Pat. No. 2,647,843 may be employed, i.e., a butadiene-acrylonitrile copolymer and SBR (styrene butadiene rubber). In the case of an acrylate adhesive and a polyurethane backing web, no primer may be required.

To cover the pressure-sensitive adhesive prior to use, a peelable facing material may be employed, e.g., cellulose acetate, regenerated cellulose (cellophane), resin coated papers and the like. These and others are described, for example, in U.S. Pat. No. 2,703,083.

Various release agents which improve the releasability characteristics of the facing may be added to the facing, e.g., stearato chromic chloride, sold by Du Pont Company under the trademark "Quilon."

THE COLOR-RESPONSIVE INDICATORS

The temperature-sensitive, color-responsive indicators employed in the practice of the invention comprise "cholesteric" liquid crystals, which contain cholesteric esters such as cholesteryl pelargonate (nonanate), cholesteryl chloride, oleyl cholesteryl carbonate, and the like, and have the property of changing color with change of temperature. They can be tailored, for example, to change color at different temperatures in the temperature range of 20° C to 250° C. Background information is set forth in "Scientific American," 211:76 August, 1964, at pages 77-85.

The liquid crystals employed in the present invention are contained in tiny capsules, e.g., 10 to 50 microns, typically 20 to 30 microns. Encapsulation provides a longer shelf life, greater reproducibility of results, overall improved stability and a greater ease in handling. They respond to temperature changes within about 0.1 to 0.5 seconds, e.g., 0.2 seconds.

ELC's covering a series of overlapping temperature ranges are commercially available. See, for example, Product Information Bulletin 681 of The National Cash Register Company, Dayton, Ohio, wherein 16 available and overlapping temperature ranges are listed and designated as follows:

| | |
|---|---|
| R-15 (15°-19°C) | R-31 (31°-35°C) |
| R-17 (17°-21°C) | R-33 (33°-37°C) |
| R-19 (19°-23°C) | R-35 (35°-39°C) |
| R-21 (21°-25°C) | R-37 (37°-41°C) |
| R-23 (23°-27°C) | R-39 (39°-43°C) |
| R-25 (25°-29°C) | R-41 (41°-45°C) |
| R-27 (27°-31°C) | R-43 (43°-47°C) |
| R-29 (29°-33°C) | R-45 (45°-49°C) |

ELC's are supplied as a water-based slurry, which can be applied to the backing web by conventional techniques, e.g., swabbing, disposition from a disposable pipette, brushing or painting, machine coating using an air knife to control film thickness, spraying, air brushing, using a Gardner bar, Mier rods and Gravure tool, and the like. To assure that the ELC's adhere tightly and securely to the backing web and resist delamination upon flexing, a primer may be applied and dried before application of the ELC's.

The need for and the type of primer depend in part upon the type of backing web. For example, when employing polyvinyl chloride film as the backing web, the primer may comprise a colloidal aqueous suspension of individual spherical particles of butadiene-acrylonitrile American rubber. A suitable form of this suspension is sold as Hycar 1571 Latex by B. F. Goodrich Chemical Company. Other suitable primers are the aforementioned primers of U.S. Pat. No. 2,647,843.

The primer may be applied in amounts of, for example, 0.2-to-1 ounce per square yard, typically about 0.7 ounce per square yard in the case of Hycar 1571. Conventional application techniques may be employed, e.g., swabbing, reverse roll techniques, air-knife coating, Meir rod or roll techniques, and the like.

To eliminate any tendency of the ELC film to separate, delaminate or crack, a plasticizer or humectant may be included in the slurry of ELC's at the time it is applied to the backing web. Conventional plasticizers known to those skilled in the art may be employed, e.g., glycerol, propylene glycol and the like. For example, satisfactory results were obtained when 0.08 ml of glycerol was admixed to a slurry of 6 ml of ELC's and 3 ml of distilled water. In specific embodiments, glycerol-plasticized ELC's were successfully attached to black paper (Dexter X-1574-100, produced by C. H. Dexter & Sons) both with Hycar 1571 Latex as a primer and also without any primer.

Alternatively, the ELC film may be covered with an overlying, substantially-transparent flexible covering such as a transparent film or clear lacquer coating. The transparent flexible covering may take the form of, for example, a thin polyethylene or cellophane covering, which may be adhered by conventional adhesives or other securing techniques, such as thermal welding. The clear lacquer coating may comprise a conventional thin spray coating of a clear lacquer which is resistant to surface grazing when subject to flexure, e.g., Grant's Clear Lacquer No. 44594, as sold by W. T. Grant & Co. The coverings protect the ELC layer from dust deposition and scratches, act as a mechanical seal for the primer and ELC layers, lock them to the flexible backing web and act as a barrier to excessive moisture loss from the ELC layer, thus maintaining the latter's resistance to fracture or delamination.

BRIEF DESCRIPTION OF THE DRAWINGS

The present invention will be more clearly understood from the following detailed description of specific embodiments, read in conjunction with the accompanying drawings, wherein:

FIG. 1 shows a typical temperature-color relationship for one range of commercially-available ELC's;

FIG. 2 shows one embodiment of a patch of the present invention wherein the patch is circular and three discrete indicators covering overlapping temperature ranges are disposed about the center in pie-shaped sectors;

FIG. 3 is a greatly-magnified fragmentary section taken on the line 3—3 of FIG. 2;

FIG. 4 is a fragmentary view of a typical temperature-color comparison chart which may be used to interpret the color presentation observed when employing temperature-sensing patches of the type shown in FIG. 2; and FIG. 5 shows another embodiment wherein the ELC's are disposed in 16 pie-shaped sectors on the patch and formulated so as to give a direct temperature indication as each segment changes color with change in temperature.

DESCRIPTION OF PREFERRED EMBODIMENTS

Referring to FIG. 1, the temperature of the ELC layer in degrees Centigrade is plotted against the theoretical wave length of reflected light and the resulting color thereof as viewed by an observer. This relationship obtains for commercially-available ELC's designated as R-33, as produced by The National Cash Register Company, Dayton, Ohio. The plotted range is 33° C to 37° C. Below 33° C the observed color is black when viewed in white light. As the temperature is raised through the 33° C to 37° C range, the observed color theoretically changes progressively from black to red to yellow to green to blue to black again.

The changes are described as theoretical because it is difficult to see the reds and yellows. Black is easily seen, green is quite distinct, and blue is clearly visible. Intermediate colors between blue and green are also quite discernible. Thus, although a single ELC indicator theoretically provides a temperature sensing range of 4° C (over 7° F) as shown above and in the chart on page 8 of this specification, its effective range is usually no more than 2° C (3.6° F). For most purposes, a more extended range is necessary, e.g., at least about 6° C (11° F) for skin temperature sensing applications. The limited range is adequately coped with by the present invention as will become apparent from the detailed description and data hereinafter presented.

Because of the aforementioned difficulty in detecting certain colors and since the wave length and color of reflected light is in part a function of the wave length and color of the incident light, tests were conducted wherein the color of the incident light was varied from the conventional "white" light usually employed, the "white" light being that produced from an unfiltered incandescent light source. The colors were achieved by successively placing blue, green, yellow and red cellophane sheets in front of the "white" incandescent light source. The effects of the color filters on the observed colors of the reflected light from the ELC patches, as compared to the observed colors using "white" light, are as follows:

| Filter Color | Observations of ELC Colors Compared to "White" Light |
| --- | --- |
| Blue | Blue, green more vivid; red, yellow comparable |
| Green | Green more vivid; red comparable; blue less vivid |
| Yellow | Green more vivid; yellow much more vivid; blue and red less vivid |
| Red | Red fainter; blue, green, yellow cannot be seen |

The data indicate that blue, green or yellow light may offer viewing advantages over conventional "white" light and that red is much poorer.

As those skilled in the art will recognize, the use of different "colored" light sources extends the utility of the present invention. For example, as shown in FIG. 1, the ability to detect yellow by using a yellow incident light provides a very sensitive temperature indication inasmuch as the yellow band covers a very narrow temperature band. Such relationship could be helpful in constructing the embodiment of the present invention illustrated in FIG. 5, discussed hereinafter.

Referring to FIGS. 2 and 3, circular patch 10, which typically might be ¾ to 1 inch in diameter, size being a matter of cost, convenience and end use, comprises flexible backing web 12, e.g., a 2 to 3 mil film of black polyvinyl chloride, having pressure-sensitive adhesive 14 on one side thereof and three pie-shaped temperature-sensitive, color-responsive indicators 16, 18 and 20 on the opposed side thereof. In this embodiment the indicators are securely fastened to web 12 by means of primer layer 22, e.g., the aforementioned Hycar 1571. Optionally, indicators 16, 18 and 20 are protected by an overlying covering 24, e.g., a thin film of transparent polyethylene or the like or a spray coating of clear lacquer.

Indicator 16 may comprise a layer of the aforementioned ELC's designated R-29, covering a theoretical temperature range of 29° C to 33° C. Similarly, indicator 18 may contain ELC's designated R-31, covering a theoretical temperature range of 31° C to 35° C. Likewise, indicator 20 may comprise ELC's designated R-33, covering a theoretical temperature range of 33° C to 37° C. The ELC's designated as R-29, R-31 and R-33 comprise blends of the cholesteric esters cholesteryl pelargonate (nonanate), cholesteryl chloride, and oleyl cholesteryl carbonate.

The three indicators are separated or spaced by a border 26 of contrasting color, preferably white. The border 26 may be printed or painted onto the backing or may comprise paper, thin plastic including polyvinyl chloride, or the like, which is adhered by conventional techniques to the underlying polyvinyl chloride film 12. So that indicators 16, 18 and 20 are readily distinguishable, any form of convenient identification means may be employed such as, for example, the one-dot, two-dot, and three-dot system illustrated. The dots may be superposed over the indicators, as shown, placed on an adjacent annular border, or otherwise conveniently located.

While not shown in FIG. 3, pressure-sensitive adhesive 14 may be adhered to web 12 by means of a primer coating. In still other embodiments, primer coating 22 or covering 24 may be omitted. In the latter case, ELC layer 20 should contain a plasticizer or humectant, e.g., glycerol, to avoid drying out and associated delamination problems.

To assist in interpreting the color presentation shown on patch 10, a color comparison chart 28 of FIG. 4 may be employed. Chart 28 shows what an observer would expect to see at each of the indicated temperatures when viewing the patch at each of the indicated temperatures. The identifying dots are located outside the periphery of the patch for convenient reference. Such a chart may be prepared, for example, by subjecting a typical patch to a carefully controlled temperature bath. The observed color presentation at a series of temperature increments is then reproduced in chart form as shown at 29a, 29b, etc. in FIG. 4.

The use of pie-shaped sectors for the patch of the present invention has the advantage that each of the discrete indicators has a portion adjacent the center. Thus, in effect, the entire range of indicators can read the temperature adjacent the center, that is, substantially at one point.

Another embodiment of the present invention is shown in FIG. 5 wherein 16 discrete indicators 40 are disposed in pie-shaped sectors about center 42 of patch 44. Each of the indicators 40 is separated from the adjacent indicator by radial spacers 46, which are preferably white in color. Annular border 48 is provided so that temperature indicia may be printed thereon. In the exemplar of Exhibit 5 these indicia are set forth in 1° Fahrenheit increments.

Indicators 40 of patch 44 are formulated whereby the brightest or most readily observable color dominates at the particular temperature shown at that segment. Thus, such color would appear in clockwise succession as the temperature is raised. For comparison, center portion 42 could show the color which is encountered when the indicated temperature is successively achieved in each successive pie-shaped segment.

As aforementioned, this embodiment might also be used with "colored" incident light to take advantage of the increased sensitivity resulting therefrom. Thus, a yellow light source might be used and the ELC's of each segment might be formulated to reflect yellow light at each of the indicated temperatures. These and other embodiments are apparent to those skilled in the art in the light of the present disclosure.

EXAMPLES

Example 1

Trisector patches similar to FIG. 2, but having an annular border similar to that of FIG. 5, are prepared by the following steps:
1. A black polyvinyl chloride tape having a pressure-sensitive adhesive secured to one side thereof is provided;
2. The adhesive-free side is cleaned with ethanol and air dried;
3. A 1¼ inch wide masking tape having 7/8 inch diameter holes with the desired trisector grid spaced at 1½ inch centers is applied to the adhesive-free surface;

4. A latex-base primer is applied to each of the three exposed sectors with a cotton swab and allowed to air dry at room temperature for 30 minutes, followed by a 5-minute bake at 160° F;
5. A diluted suspension of ELC's (two volume parts of ELC to one volume part of water) is then applied with a swab to each of the sectors with a 2-hour air drying period between successive applications to minimize cross mixing, the ELC's in the three sectors being the aforementioned R-29, R-31 and R-33, respectively;
6. Two coats of clear lacquer are sprayed over the ELC-coated sectors and masked areas with 10-minute intervals between each spraying and allowed to air dry at room temperature; and
7. 1⅛ inch diameter patches with the ⅞-inch ElC-coated trisector are cut out of the tape to provide skin patches, having the characteristics hereinabove described.

A series of tests were carried out employing patches prepared as above described. These patches were placed on a surface that was heated, and color observations using "white" incident light were made in 0.5° C increments from 29° C through 38° C. Data obtained for one of the patches are as follows:

Observed Color of Each Patch Sector

| Temp. of Bath, °C | R-29 | R-31 | R-33 |
| --- | --- | --- | --- |
| Below 29 | Black | Black | Black |
| 29.0 | Yellow | " | " |
| 29.5 | Green | " | " |
| 30.0 | " | " | " |
| 30.5 | " | " | " |
| 31.0 | Blue | " | " |
| 31.5 | " | Green | " |
| 32.0 | " | " | " |
| 32.5 | " | Blue-Green | " |
| 33.0 | " | Green | " |
| 33.5 | " | Blue | " |
| 34.0 | Blue-Black | " | " |
| 34.5 | Black | " | " |
| 35.0 | Blue | " | Red |
| 35.5 | " | " | Green |
| 36.0 | " | " | " |
| 36.5 | Black | Blue-Black | " |
| 37.0 | " | Black | Blue-Green |
| 37.5 | " | Blue | Black |
| 38.0 | Blue-Black | Blue-Black | Blue |

Substantially the same data were obtained with three similar notches. Such data can be employed, for example, in the preparation of color comparison chart 28 of FIG. 4.

Example 2

Trisector patches similar to FIG. 2 are prepared substantially as described in connection with Example 1 except that the clear lacquer spray coatings are eliminated. This minimizes the possibility of surface crazing when the patches are subjected to repeated flexure, but could unduly accelerate drying out of the ELC coating. To prevent undue drying and possible delamination of the ELC coating, a humectant or plasticizer in the form of glycerol is added to the slurry of ELC prior to application to the primer-coated polyvinyl chloride backing. After 250 complete 360° flexes, this construction shows no tendency to delaminate or crack. Temperature-color response is substantially the same as in Example 1.

Further tests also show that the process of Example 1 can be simplified somewhat. The 5-minute baking period at 160° F of step 4 can be eliminated without affecting the adhesion of the primer to the backing or the ELC to the primer. The ELC slurries can also be added to each of the sectors using a disposal pipette rather than a cotton swab. A more uniform suspension results.

From the above description it is apparent that the objects of the present invention have been achieved. The temperature-sensing patch conforms to the contours of the skin and provides good thermal contact. It covers a wide range of temperatures; and because of its overall low thermal mass, it gives a very rapid response. It is very stable in sensing temperature and is otherwise mechanically sound. While only certain embodiments have been illustrated, many alternative modifications will be apparent from the above description to those skilled in the art. These and other alternatives are considered within the spirit and scope of the present invention, and coverage thereof is intended by this application.

Having described the invention, what is claimed is:

1. In a temperature-sensing device for indicating surface temperatures with temperature-sensitive, color-responsive liquid crystals, the improvement which comprises a patch comprising:
   a. a flexible backing web;
   b. a pressure-sensitive adhesive coated on one side thereof; and
   c. a plurality of discrete temperature-sensitive, color-responsive indicators adhered on the other side thereof, each of said indicators comprising a layer of encapsulated liquid crystals, the color spectrum of each indicator being responsive to the temperature of the indicator within a predetermined, continuous temperature range.

2. The temperature-sensing patch of claim 1 wherein the predetermined temperature range of each indicator differs.

3. The temperature-sensing patch of claim 2 wherein the predetermined temperature range of adjacent indicators overlap.

4. The temperature-sensing patch of claim 1 wherein the adjacent indicators are separated by a border of contrasting color.

5. The temperature-sensing indicator of claim 1 wherein said backing web is circular and said indicators are disposed in spaced pie-shaped sectors about the center thereof.

6. The temperature-sensing patch of claim 5 wherein said web is substantially black in color and the spaces between adjacent indicators are substantially white in color.

7. The temperature-sensing patch of claim 1 including an overlying substantially-transparent flexible covering for said indicators.

8. The temperature-sensing patch of claim 7 wherein said covering comprises a transparent plastic film adhered thereto.

9. The temperature-sensing patch of claim 7 wherein said covering comprises a clear lacquer coating.

10. The temperature-sensing patch of claim 1 wherein the encapsulated liquid crystals of each indicator contain a plasticizer to enhance conformability of each indicator to said flexible backing web.

11. The temperature-sensing patch of claim 10 wherein said plasticizer comprises glycerol.

12. The temperature-sensing patch of claim 1 wherein said flexible backing web comprises a black polyvinyl chloride film.

13. The temperature-sensing patch of claim 1 wherein said pressure-sensitive adhesive is an acrylate-type adhesive.

14. The temperature-sensing patch of claim 1 including a primer coating on said other side thereof to increase the adhesion of said indicators to said web.

15. The temperature-sensing patch of claim 14 wherein the primer coating comprises a dried latex colloidal suspension.

16. The temperature-sensing patch of claim 1 including a peelable facing material covering the exposed surfaces of said pressure-sensitive adhesive.

* * * * *